United States Patent [19]

Hermann et al.

[11] 4,161,565
[45] Jul. 17, 1979

[54] PLASTICIZER CONTAINING POLYVINYLBUTYRAL SHEETS HAVING A REDUCED ADHESION TO GLASS

[75] Inventors: Hans D. Hermann, Bad Soden am Taunus; Joachim Ebigt, Frankfurt am Main, both of Fed. Rep. of Germany

[73] Assignee: Hoechst Aktiengesellschaft, Frankfurt am Main, Fed. Rep. of Germany

[21] Appl. No.: 841,394

[22] Filed: Oct. 12, 1977

[30] Foreign Application Priority Data

Oct. 14, 1976 [DE] Fed. Rep. of Germany ....... 2646280

[51] Int. Cl.$^2$ .............................................. C08K 5/17
[52] U.S. Cl. .............................. 428/437; 260/30.6 R; 260/31.6; 260/31.8 R
[58] Field of Search ................ 526/3, 6; 260/30.6 R, 260/31.4 R, 31.6, 31.8 R, DIG. 15, DIG. 19, DIG. 20; 428/437

[56] References Cited

U.S. PATENT DOCUMENTS

| | | | |
|---|---|---|---|
| 2,680,724 | 6/1954 | Oppenheim | 260/31.4 R |
| 2,682,520 | 6/1954 | Bump | 260/31.4 R |
| 3,005,793 | 10/1961 | Wagner | 260/DIG. 20 |
| 3,361,699 | 1/1968 | Mattimoe | 260/31.4 R |
| 3,484,479 | 12/1969 | Rinkler | 526/3 |
| 3,841,955 | 10/1974 | Coaker | 260/30.6 R |
| 3,894,077 | 7/1975 | Horikawa | 526/3 |

Primary Examiner—Paul R. Michl
Attorney, Agent, or Firm—Curtis, Morris & Safford

[57] ABSTRACT

Plasticizer containing polyvinylbutyral sheets are known intermediate layers for glass laminates. Generally, the polyvinylbutyral used for this application contains certain amounts of vinyl alcohol units and vinyl acetate units. In order to adjust an optimum adhesion to glass, certain additives are mixed with the polyvinylbutyral, which additives must not cause discoloration of the laminate and deterioration of the transparency. Betains are especially suitable anti-adhesives, and efficient in very small amounts.

5 Claims, No Drawings

PLASTICIZER CONTAINING POLYVINYLBUTYRAL SHEETS HAVING A REDUCED ADHESION TO GLASS

It is known that laminated glass consists of two or more glass panes which are held together by plastic sheets. This intermediate plastic layer ensures that the laminated pane does not shatter on heavy impact, and that no glass fragments are scattered about when the glass breaks.

In order to guarantee this kind of protection, the plastic sheet has to have a definite degree of adhesion to the glass. When this degree of adhesion is too high, the glass, on impact, does not come loose at all from the plastic sheet which, at the place of fracture, is immediately overstretched and torn. In the case of a too low degree of adhesion, glass fragments become detached from the plastic sheet and fly about. When the degree of adhesion is correct the sheet comes loose at the place of fracture only slightly, so that it is not overstretched, thus remaining able to withstand the impact and to prevent glass fragments from being detached from the laminate and scattered.

For a long time, plasticizer-containing polyvinylbutyral sheets have proved to be suitable as intermediate layers for laminated glass. It has been described that the adhesion of polyvinylbutyral to glass, which is generally too high, can be decreased to a determined degree, in a most simple manner, for example by addition of water. However, in the case of strongly adhering sheets, the water content must be in a range (more than 0.8%) which causes undesirable bubble formation in the laminate.

Furthermore, it has been proposed to adjust the adhesion to glass by addition of alkali metal salts, alkaline earth metal salts or other metal salts. High strength polyvinylbutyral sheets having a large amount of vinyl alcohol units, however, have generally an adhesion to glass in a range which requires the addition of considerable quantities of these salts, for example more than 0.3%, relative to the sheet. This causes discoloration of the laminate and deterioration of its transparency.

The same goes for different surface-active substances and certain silicon containing anti-adhesives which, moreover, increase the water-sensitivity of the laminates.

Lecithin is another known anti-adhesive which is highly efficient, so that 0.1% is sufficient to reduce the adhesion to glass. However, lecithin has the disadvantage that it is insufficiently soluble in the plasticizer as well as in water, so that its incorporation into the polymer/plasticizer mixture is very difficult. For example, the very advantageous method of drying from aqueous solution cannot be applied in the case of lecithin.

It has now been found that the plastic sheets for laminated glass as claimed herein have considerable advantages as compared to the above described ones. It has been found that betains are especially suitable for reducing the adhesion to glass of plasticized polyvinylbutyral sheets. They are highly efficient at low concentration, they can be easily incorporated into the sheets and cause neither the transparency and color nor the water-sensitivity of the glass laminates to deteriorate.

The betains suitable for reducing the adhesion to glass are compounds which contain a quaternary ammonium group and a carboxylic or sulfonic acid group in the same molecule, and they correspond to the following structures:

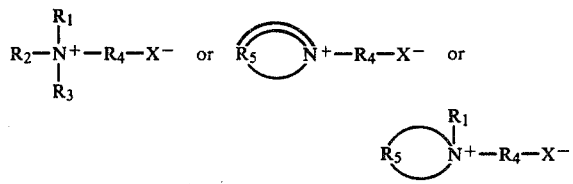

in which $R_1$, $R_2$ and $R_3$ are linear or branched alkyl radicals having from 1 to 6 carbon atoms, $R_4$ is a linear or branched alkylene radical having from 1 to 6 carbon atoms, $R_5$ is a radical having 4 or 5 chain members and belonging to an aliphatic or aromatic ring system, and $X^-$ is $-COO^-$ or $-SO_3^-$. The cited radicals may be substituted by hydroxyl, carboxyl, ester, ether or thioether groups, and $R_5$ may also contain oxygen or nitrogen as chain members.

The concentration of betain required for adjusting the adhesion to glass depends on the original adhesion of the plasticized polyvinylbutyral free from additives; generally, it is from 0.001 to 0.3, preferably 0.005 to 0.1, weight %, relative to the polymer/plasticizer mixture.

Examples of suitable betains are the following compounds:

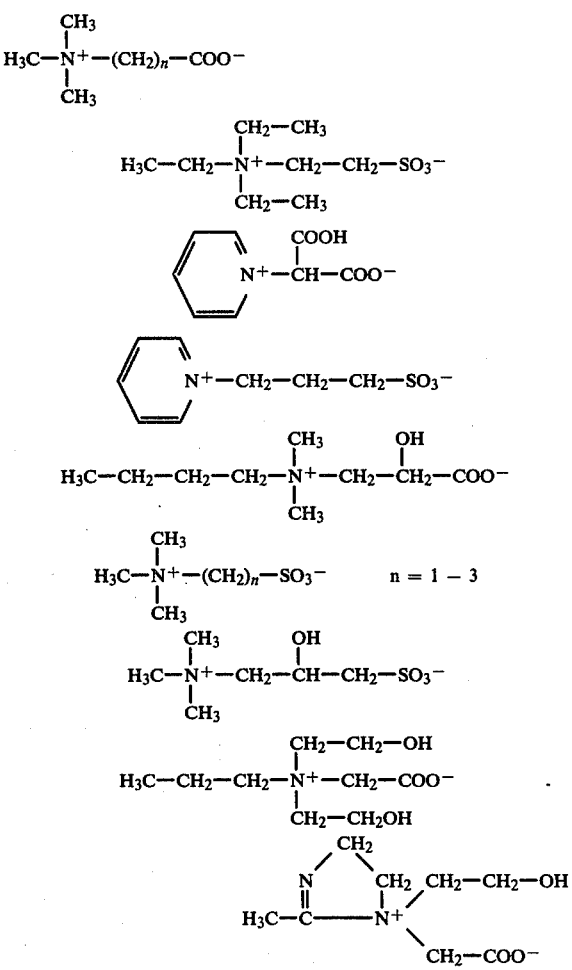

The betains used in accordance with this invention are highly efficient; their activity is by far superior to that of the salts known as anti-adhesives as well as that of surfactants.

The betains to be used for reducing the adhesion to glass may be added in principle to all known polyvinylbutyral/plasticizer mixtures.

Suitable polyvinylbutyrals for the manufacture of sheets for laminates are for example those which contain, besides vinylbutyral units, from 12 to 25 weight %, preferably 17 to 23 weight %, of vinyl alcohol units and from 0.5 to 5 weight %, of vinyl acetate units. Their average molecular weight should be in a range which ensures that a 5% solution of the polymer in ethanol has a viscosity at 23° C. of from 40 to 150 cP, preferably from 50 to 120 cP. The polymer may contain low molecular weight components which, per se, have a viscosity of less than 40 cP under the conditions as described. (The viscosity is measured according to German Industrial Standard DIN 53 015.)

For processing the polyvinylbutyrals to sheets, a plasticizer has to be added to the polyvinylbutyral either before or during the corresponding operations. The amount of plasticizer to be added is from 20 to 60 parts by weight, generally from 30 to 50 parts by weight per 100 parts by weight of polyvinylbutyral. Suitable plasticizers are the compounds usually employed, for example esters of polyols or esters of polyvalent acids, such as esters of triethyleneglycol with aliphatic carboxylic acids having from 6 to 10 carbon atoms, especially 2-ethylbutyric acid, glycerin monooleate, dibutyl sebacate, di($\beta$-butoxyethyl)adipate, dioctyl phthalate or tricresyl phosphate. These plasticizers may be used per se or as mixtures. Furthermore, substances may be added which stabilize the mixture against degradation, for example small amounts of alkali or other salts having an alkaline reaction, and furthermore, oxidation stabilizers such as phenols substituted in 2-, 4- and/or 6-position, bisphenols or terpenephenols.

The betains used in accordance with this invention may be incorporated in any stage before, during or after the manufacture of the sheets, and in a manner as desired.

Since the betains used are water-soluble, they may be easily applied onto the particles of polyvinylbutyral powder by drying from aqueous solution. Especially advantageous is the addition during the work-up process, for example by spraying a betain solution onto the filtered but not yet dried polymer. Alternatively, the betains may be added during the reaction of the polyvinyl alcohol with n-butyraldehyde; however, in this case, a higher concentration of anti-adhesive is often required. Another possibility is the addition by mixing the finely powdered betain with the dry polymer powder. Furthermore, the betain may be applied by drying, preferably from aqueous solution, onto the surface of the finished sheet.

The betain concentration required for adjusting the intended adhesion depends on different factors: one of them is the efficiency of the betain used, which efficiency for its part depends on the compatibility of the betain with the polymer/plasticizer mixture, and on the molar concentration of the betain groups. Another factor is the original adhesion to glass of the polyvinylbutyral used, which is high especially in the case of polyvinylbutyral having an elevated polyvinyl alcohol content (more than 20.0 weight % of polyvinyl alcohol). Furthermore, it has been found that the adhesion to glass is especially high in the case of plasticized high-strength polyvinylbutyral sheets in which the intermolecular forces between the vinyl alcohol units are increased. By means of the usual anti-adhesives, the optimum adhesion of these polymers can be obtained either not at all or with considerable disadvantages only. Such high-strength polyvinylbutyral sheets are characterized by their tensile strength being above 2,500 N/cm$^2$ (measured according to German Industrial Standard DIN 53 455 on sheets having a thickness of 0.76 mm, at a rate of pull of 20 cm/min and a gripping length of 5.0 cm). Thus, betains are especially suitable for use in this kind of polymers.

Finally, the required amount of anti-adhesive depends also on the application of the glass laminate. Windshields must have a high impact strength. In order to achieve this, the adhesion is reduced in such a manner that it is just sufficient to prevent glass fragments from being scattered. Glass for buildings is less exposed to heavy impact and therefore the amount of anti-adhesive may be adjusted to provide a higher degree of adhesion.

Optionally by simple preliminary tests, the expert skilled in the art can easily adjust the adhesion for any polyvinylbutyral and for any application intended. Generally, the necessary betain concentration is from 0.001 to 0.3, preferably 0.005 to 0.1 weight %, relative to the polymer/plasticizer mixture.

Polymer, plasticizer, betain and, optionally, other additives may be processed on a calender or extruder to give a sheet having a thickness of, preferably, from 0.3 to 0.9 mm. Alternatively, all components may be dissolved in a suitable solvent, for example an alcohol, and cast sheets may be manufactured from this solution.

The finished sheet, optionally after conditioning necessary to reduce the water content of the sheet to 0.2 to 0.6 weight %, is processed in known manner to give the laminate. For example, the sheet is placed between two glass panes each having a thickness of from 1 to 3 mm, and the whole is molded at 60° to 90° C. to give a prelaminate, which is then molded, for example in an autoclave, at a temperature of 120° to 160° C. and under a pressure of 8 to 10 bars to give the final laminate.

This laminate may then be subjected to an extensive test program.

In order to evaluate the quality of the laminate, especially the adhesion to glass, very often the so-called "pummel test" is applied. A glass laminate is cooled to −18° C., placed on a metal substrate and smashed by means of a hammer having a weight of 500 grams. According to the amount of glass coming off from the sheet, the laminate is given pummel marks of from zero (no adhesion) to 10 (complete adhesion). A detailed description of the test is given in British patent specification No. 1,093,864.

There is another more precise test method, according to which a sheet laminated with one glass pane is pulled off from the glass under defined conditions. This test method is also described in detail in the above Patent Specification. However, it differs in some respects from the method used for the present invention which is described as follows:

A plasticized polyvinylbutyral sheet (100×150×0.8 mm) is molded to a corresponding glass plate for 5 minutes at a temperature of 145° C. and a pressure of 100 N/cm$^2$. For reinforcing purposes, a non-stretchable fabric is molded into the laminate on the other side of the sheet. Subsequently, the laminate is cut into strips of 15×100 mm. 3 cm of the conditioned polyvinylbutyral strip are pulled off from the glass. The strip of laminate to be tested is clamped horizontally in an Instron test machine, and the strip of sheet is pulled off vertically in upward direction at a rate of 20 cm/min. The peel resistance in N/cm is the average of the results for 8 strips.

A further method for controlling the correctly adjusted adhesion to glass is offered by the falling ball test according to German Industrial Standard DIN 53 206 (dynamic method).

The following examples illustrate the invention. The tests have been carried out according to the above methods. All quantities indicated are by weight.

EXAMPLE 1

Polyvinylbutyral was prepared by acetalizing polyvinyl alcohol in the presence of 0.3% (relative to polyvinylbutyral) of the betain

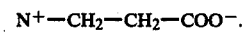

100 Parts of this polymer having an amount of 20.0 weight % of vinyl alcohol units were extruded with 41 parts of a $C_6$–$C_9$ fatty acid ester mixture of triethyleneglycol. From this extruded product, sheets having a thickness of 0.76 mm were molded at 150° C. After having adjusted the water content to 0.5% by conditioning, the sheets were processed to laminates in order to determine the peel resistance and the pummel values. These laminates had a pummel value of 4 and a peel resistance of 17 N/cm. In contrast thereto, a polyvinylbutyral prepared in the same manner but in the absence of betain, and processed and tested as described, gave a pummel value of 10, a peel resistance of 57 N/cm and a dropping height of 2.00 m.

EXAMPLE 2

The amounts of betain $(H_3C)_3$—$N^+$—$CH_2$—$COO^-$ indicated in the following Table were applied by drying from aqueous solution onto polyvinylbutyral powder. After mixing with 29 weight % of triethyleneglycol ester of 2-ethylbutyric acid, the polymers were processed to sheets having a thickness of 0.76 mm. With regard to color and transparency, the polymers showed no difference. Further data may be taken from the Table.

EXAMPLE 3

After work-up of a polyvinylbutyral to be used for the manufacture of high-strength sheets for glass laminates and having 21.0 weight % of vinyl alcohol units and a viscosity of 65 cP according to German Industrial Standard DIN 53 015, 0.1% (relative to the polymer/plasticizer mixture) of betain $(H_3C)_3N^+$—$CH_2COO^-$ were sprayed on the still moist polymer from aqoues solution. After drying, 100 parts of polymer were extruded with 42.5 parts of triethyleneglycol ester of 2-ethylbutyric acid to form sheets having a thickness of 0.79 mm. After conditioning to a water content of 0.4%, laminates were manufactured from this sheet.

When testing the adhesion to glass, the following data were obtained: pummel value 2 to 3, dropping height 7.00 m and peel resistance 12.0 N/cm. From the same material, a sheet free from betain was obtained according to the above method, which sheet had a pummel value of 10, a dropping height of 1.50 m and a peel resistance of 85 N/cm.

EXAMPLE 4

100 Parts of polyvinylbutylral having 20.9 weight % of vinyl alcohol units were kneaded at 140° C. with 39 parts of a triethyleneglycol ester of $C_6$–$C_9$ fatty acids and 0.14 part of the betain $(H_3C$—$CH_2)_3N^+$—$(CH_2)_3$—$SO_3^-$. Sheets having a thickness of 0.76 mm were molded from the polymer/plasticizer mixture, and glass laminates were manufactured from the sheets after conditioning according to the method as described above. The laminates, at a water content of the sheet of 0.5%, had a pummel value of 1 and a peel resistance of 5.5 N/cm. Laminates manufactured in the same manner from sheets free from betain had a peel resistance of 46 N/cm and a pummel value of 9.

EXAMPLE 5

100 Parts of polyvinylbutyral for high-strength sheets for laminates, having a viscosity of 71 cP, were extruded with 41 parts of triethyleneglycol ester of 2-ethylbutyric acid and the anti-adhesives indicated in the following Table to give sheets having a thickness of 0.76 mm. The tests on glass laminates manufactured from the different sheets prove the superiority of the betain used in comparison to a known anti-adhesive.

| Sample | Content of vinyl alcohol units (wt. %) | Viscosity DIN 53015 5% in $C_2H_5$—OH 23° C. (cp) | Betain (% rel. to mixture) | $H_2O$ content of sheet (%) | peel resistance (N/cm) |
|---|---|---|---|---|---|
| 1 (comp.) | 20.2 | 81 | — | 0.6 | 44.0 |
| 2 | 20.2 | 81 | 0.02 | 0.6 | 10.5 |
| 3 | 20.2 | 81 | 0.08 | 0.6 | 6.5 |

| Sample | $H_2O$ Content (%) | Anti-adhesive | Concentration (% rel. to sheet) | Peel resistance (N/cm) | Dropping height (m) |
|---|---|---|---|---|---|
| 1 (comp.) | 0.4 | — | — | 82 | 1.75 |
| 2 (comp.) | 0.4 | $C_{18}H_{37}N$((CH_2$—$CH_2$—$O)_4H)_2$ | 0.1 | 51 | 2.50 |

-continued

| Sample | H₂O Content (%) | Anti-adhesive | Concentration (% rel. to sheet) | Peel resistance (N/cm) | Dropping height (m) |
|---|---|---|---|---|---|
| 3 | 0.4 | $(H_3C-CH_2)_3N^+-CH_2-CH_2-COO^-$ | 0.1 | 15 | 6.00 |

EXAMPLE 6

| Sample | H₂O Content (%) | Anti-adhesive | Concentration (% rel. to sheet) | Peel resistance (N/cm) | Dropping height (m) |
|---|---|---|---|---|---|
| 1 (comp.) | 0.4 | — | — | 82 | 1.75 |
| 2 (comp.) | 0.4 | $C_{18}H_{37}N\begin{matrix}(CH_2-CH_2-O)_4H\\(CH_2-CH_2-O)_4H\end{matrix}$ | 0.1 | 51 | 2.50 |
| 3 | 0.4 | $(H_3C-CH_2)_3N^+-CH_2-CH_2-COO^-$ | 0.1 | 15 | 6.00 |

100 Parts of a polyvinylbutyral having a viscosity of 95 cP in a 5% ethanolic solution at 23° C. and 19.7 weight % of vinyl alcohol units were extruded with 40 parts of triethyleneglycol-bis(2-ethylbutyric acid ester) to form sheets having a thickness of 0.76 mm which sheets, after conditioning, had a water content of 0.4%. The sheets contained the anti-adhesives indicated in the following Table. After manufacture of glass laminates and testing the adhesion to glass, the superiority of the betain in accordance with this invention was manifest.

| Sample | Anti-adhesive | Concentration (% rel. to sheet) | Discoloration as compared to sample | Peel resistance (N/cm) |
|---|---|---|---|---|
| 1 (comp.) | — | — | — | 51 |
| 2 | $H_3C-C\underset{\underset{CH_2}{\underset{\diagdown}{N}}}{\overset{\overset{N}{\diagup}}{\|}}-\overset{CH_2-COO^-}{\underset{CH_2}{N^+}}-CH_2-CH_2-OH$ | 0.1 | none | 4.5 |
| 3 (comp.) | $H_3C-COOK$ | 0.3 | slight yellow discoloration | 27 |

What is claimed is:

1. A glass laminate comprising at least two panes of glass adherent to a plastic interlayer, said interlayer being a plasticized polyvinylbutyral containing an adhesion-reducing amount of a betain.

2. A glass laminate according to claim 1 wherein said interlayer contains from 0.001 to 0.3% by weight of said betain.

3. A glass laminate comprising at least two panes of glass adherent to a plastic interlayer, said interlayer being a plasticized polyvinylbutyral containing an adhesion-reducing amount of a betain having the structure in which $R_1$, $R_2$ and $R_3$ are linear or branched alkyl radicals having from 1 to 6 carbon atoms, $R_4$ is a linear or branched alkylene radical having from 1 to 6 carbon atoms, $R_5$ is a radical having 4 or 5 chain members and belonging to an aliphatic or aromatic ring system, and $X^-$ is the radical $-COO^-$ or $SO_3-$; the radicals $R_1$ through $R_5$ optionally being substituted by hydroxyl, carboxyl, ester, ether or thioether groups, and $R_5$ optionally containing oxygen or nitrogen as chain member.

4. Glass laminates as claimed in claim 3, wherein the polyvinylbutyral contains 19.0 to 23.0 weight % of vinyl alcohol units.

5. A method of making a glass laminate which comprises preparing a film of plasticized polyvinylbutyral containing from 0.001% to 0.3% of a betain, placing said film between adjacent panes of glass and heating the resulting assembly at an elevated pressure in a mold to produce said laminate.

* * * * *